United States Patent
Chino

(10) Patent No.: US 9,176,164 B2
(45) Date of Patent: Nov. 3, 2015

(54) SENSING DEVICE AND ELECTRONIC APPARATUS

(75) Inventor: Taketo Chino, Hokuto (JP)

(73) Assignee: Seiko Epson Corporation (JP)

( * ) Notice: Subject to any disclaimer, the term of this patent is extended or adjusted under 35 U.S.C. 154(b) by 876 days.

(21) Appl. No.: 13/118,790

(22) Filed: May 31, 2011

(65) Prior Publication Data

US 2012/0023354 A1 Jan. 26, 2012

(30) Foreign Application Priority Data

Jul. 22, 2010 (JP) ................. 2010-164594

(51) Int. Cl.
*G06F 1/32* (2006.01)
*G01P 13/00* (2006.01)
*G01P 15/00* (2006.01)
*H04W 52/02* (2009.01)

(52) U.S. Cl.
CPC ............. *G01P 13/00* (2013.01); *G01P 15/00* (2013.01); *G06F 1/3206* (2013.01); *H04W 52/0254* (2013.01)

(58) Field of Classification Search
None
See application file for complete search history.

(56) References Cited

U.S. PATENT DOCUMENTS

| | | | |
|---|---|---|---|
| 4,197,582 A * | 4/1980 | Johnston et al. | 702/58 |
| 6,505,515 B1 | 1/2003 | Delaporte | |
| 7,689,378 B2 | 3/2010 | Kolen | |
| 7,868,918 B2 | 1/2011 | Kamiya et al. | |
| 2005/0081629 A1 | 4/2005 | Hoshal | |
| 2006/0236761 A1 | 10/2006 | Inoue et al. | |
| 2006/0249323 A1 | 11/2006 | Kurata | |
| 2007/0168047 A1 | 7/2007 | Cromer et al. | |
| 2007/0250261 A1 | 10/2007 | Soehren | |
| 2008/0174444 A1 | 7/2008 | Noda et al. | |
| 2008/0201501 A1 * | 8/2008 | Partani et al. | 710/60 |
| 2008/0234935 A1 * | 9/2008 | Wolf et al. | 701/216 |
| 2010/0192662 A1 * | 8/2010 | Yanni | 73/1.38 |

FOREIGN PATENT DOCUMENTS

| | | |
|---|---|---|
| JP | 2002-532721 A | 10/2002 |
| JP | 2002-538456 A | 11/2002 |
| JP | 2006-298147 A | 11/2006 |
| JP | 2008-051587 A | 3/2008 |
| JP | 2008-175771 | 7/2008 |
| JP | 2009-134071 | 6/2009 |
| WO | WO-00-36424 A1 | 6/2000 |
| WO | WO-00-52443 A1 | 9/2000 |
| WO | WO-2009-138941 A1 | 11/2009 |

* cited by examiner

*Primary Examiner* — Kim Huynh
*Assistant Examiner* — Vincent Chang
(74) *Attorney, Agent, or Firm* — Harness, Dickey & Pierce, P.L.C.

(57) ABSTRACT

A sensing device includes: a sensor module that includes a group of sensors, at least one of which is set as a motion sensor, and can switch an operation mode to an overall operation mode in which all of the group of sensors operate and a partial operation mode in which a part of the sensors including the at least one sensor set as the motion sensor operate; and a control unit that controls the switching of the operation mode of the sensor module on the basis of an output from the motion sensor.

7 Claims, 14 Drawing Sheets

SENSING DEVICE AND ELECTRONIC APPARATUS

BACKGROUND

1. Technical Field

The present invention relates to a sensing device, an electronic apparatus, and the like.

2. Related Art

Some sensor module includes a sensor that detects the motion of a gyro sensor, an acceleration sensor, or the like (a motion sensor). For example, a sensor module disclosed in JP-A-2009-134071 (Patent Document 1) converts a signal from a motion sensor and outputs the signal at a predetermined interval. In this invention, an embodiment in which signal processing is performed without using a CPU to suppress power consumption is disclosed. However, the power consumption increases because other components such as a sensor, an analog front end (AFE), an AD converter (ADC) continue to operate.

In JP-A-2008-175771 (Patent Document 2), two motion sensors having different measurement ranges and equivalent functions are prepared and switched according to a situation, whereby an increase in current consumption can be suppressed. However, cost increases because the two motion sensors having the equivalent functions are prepared regardless of the fact that the motion sensors operate only exclusively.

SUMMARY

An advantage of some aspects of the invention is to provide a sensing device with lower power consumption by controlling an operation mode or the like of a sensor module on the basis of an output from a motion sensor.

(1) An aspect of the invention is directed to a sensing device including: a sensor module that includes a group of sensors, at least one of which is set as a motion sensor, and can switch an operation mode to an overall operation mode in which all of the group of sensors operate and a partial operation mode in which a part of the sensors including the at least one sensor set as the motion sensor operate; and a control unit that controls the switching of the operation mode of the sensor module on the basis of an output from the motion sensor.

According to the aspect, since the control unit switches the overall operation mode and the partial operation mode on the basis of an output from the motion sensor, it is possible to suppress power consumption compared with power consumed when all the sensors always operate. Since it is unnecessary to separately prepare a sensor, the problem of an increase in cost does not occur.

The motion sensor is a sensor that detects motion. Specifically, the motion sensor is a gyro sensor, an acceleration sensor, a speed sensor, or the like. The sensor module includes plural sensors (a group of sensors) in which at least one motion sensor is included.

A signal based on the output from the motion sensor may be the output itself from the motion sensor, may be a value obtained by amplifying and sampling the output, may be a value obtained by measuring an amount of change of the output, or may be a value obtained by subjecting the output to other arithmetic processing. The arithmetic processing includes calculation of a maximum, a minimum, or an average concerning an output value from the motion sensor. The signal based on the output from the motion sensor may be outputs from plural motion sensors or may be an output from one motion sensor.

The overall operation mode is a normal operation mode of the sensing device in which all of the group of sensors of the sensor module operate. The partial operation mode is a mode in which only a part of the group of sensors, i.e., plural or one sensor including at least one motion sensor operates. Therefore, when the operation mode of the motion sensor is the partial operation mode, power consumption of the sensing device is small compared with that during the overall operation mode.

(2) In the sensing device, the control unit may perform switching control from the overall operation mode to the partial operation mode on the basis of a comparison result of the signal based on the output from the motion sensor and a first threshold in a given time and perform switching control from the partial operation mode to the overall operation mode on the basis of a comparison result of the signal based on the output from the motion sensor and a second threshold.

According to this configuration, since the control unit performs switching control for the operation mode on the basis of the comparison result of the signal based on the output from the motion sensor and the first threshold or the second threshold, it is possible to surely shift the operation mode with little misdetermination.

The output from the motion sensor changes in association with whether the sensing device is operating (e.g., moving, accelerating, or rotating). At this point, the output from the motion sensor may be associated with only a change in a specific direction (e.g., the horizontal direction or the vertical direction).

For example, in a sensing device that performs measurement during operation, when the signal based on the output from the motion sensor is smaller than the first threshold in the overall operation mode, the control unit can determine that the sensing device is not operating. For example, the control unit may shift the operation mode of the motion sensor to the partial operation mode and set the sensing device in a low power consumption state according to a mode control signal.

Conversely, in the partial operation mode, when the signal based on the output from the motion sensor is larger than the second threshold, the control unit can determine that the sensing device is operating. For example, the control unit may shift the motion sensor to the overall operation mode according to a mode control signal and cause the sensor module to perform a normal operation.

In the switching from the overall operation mode to the partial operation mode, if the overall operation mode is shifted to the partial operation mode by mistake, measurement data cannot be obtained from the sensor. Therefore, in order to perform accurate determination, it is desirable to perform the determination using signals based on outputs from the motion sensor obtained in a certain length of time. For example, a condition for the switching may be that all the signals are smaller than the first threshold. A given time (in the following explanation, represented as determination time) for acquiring the signals may be set in, for example, a unit of millisecond, second, or minute or may be determined on the basis of the number of data necessary and sufficient to determination of shift.

On the other hand, in the switching from the partial operation mode to the overall operation mode, there is a request that the operation of the sensing device is returned to the normal operation as soon as possible. Therefore, the partial operation mode may be immediately shifted to the overall operation mode when the signal based on the output from the motion sensor exceeds the second threshold.

The first threshold and the second threshold used by the control unit for determination may be the same value or the second threshold may be set larger than the first threshold with hysteresis imparted to the thresholds to prevent the thresholds from being easily affected by noise. The thresholds may be able to be set by a method in which a user writes the thresholds in, for example, a register or may be stored in a ROM or the like in advance.

In the case of a sensing device that performs measurement during stop, it is possible to deal with the sensing device simply by reversing a magnitude relation in the comparison of the thresholds in the example explained above. For convenience of explanation, the sensing device that performs measurement during operation is the premise of the following explanation.

(3) Another aspect of the invention is directed to a sensing device including: a sensor module that includes a group of sensors and can switch an operation mode to an overall operation mode in which all of the group of sensors operate and a stop operation mode in which at least apart of the sensors stop; an auxiliary sensor module that includes at least one motion sensor; and a control unit that controls the switching of the operation mode of the sensor module on the basis of an output from the motion sensor.

(4) In the sensing device, the control unit may perform switching control from the overall operation mode to the stop operation mode on the basis of a comparison result of a signal based on the output from the motion sensor and a first threshold in a given time and perform switching control from the stop operation mode to the overall operation mode on the basis of a comparison result of the signal based on the output from the motion sensor and a second threshold.

According to this configuration, since the auxiliary sensor module including at least one motion sensor is used, it is possible to switch the operation mode of the sensor module to the stop operation mode for stopping at least a part of the group of sensors. At this point, it is possible to suppress power consumption. In order to effectively suppress power consumption, all of the group of sensors of the sensor module may be stopped in the stop operation mode. The auxiliary sensor module only has to be capable of detecting a specific operation of the sensing device and does not need to be equivalent to the sensor module. In other words, an inexpensive sensor can be selected as the auxiliary sensor module. The problem of an increase in cost in the invention of Patent Document 2 does not occur.

A method in which the control unit switches the operation mode is the same as that in the above explanation of the invention. It is possible to surely shift the operation mode with little misdetermination. However, the stop operation mode is used instead of the partial operation mode.

In the aspect, an output from the motion sensor of the auxiliary sensor module changes in association with the operation of the sensing device. The control unit can perform the determination of the operation mode on the basis of the output from the motion sensor of the auxiliary sensor module. Therefore, the group of sensors of the sensor module do not have to include a motion sensor. In the aspect, for example, it is possible to realize low power consumption without changing the configuration of the existing sensor module (e.g., a design change). This makes it possible to perform flexible design of the sensing device.

(5) Still another aspect of the invention is directed to a sensing device including: a sensor module that includes a group of sensors, at least one of which is set as a motion sensor, and can switch an operation mode to an overall operation mode in which all of the group of sensors operate and a stop operation mode in which at least a part of the sensors stop; an auxiliary sensor module that includes at least one motion sensor and can switch an operation mode to an operation mode in which the sensors normally operate and a stop mode in which the sensors stop the operation; and a control unit that controls the switching of the operation mode of the sensor module on the basis of an output from the motion sensor of the sensor module or the auxiliary sensor module and controls to switch the operation mode of the auxiliary sensor module to the stop mode when the operation mode of the sensor module is the overall operation mode and to the operation mode when the operation mode of the sensor module is the stop operation mode.

(6) In the sensing device, the control unit may perform the switching control from the overall operation mode to the stop operation mode on the basis of a comparison result of a signal based on the output from the motion sensor of the sensor module and a first threshold in a given time and perform the switching control from the stop operation mode to the overall operation mode on the basis of a comparison result of a signal based on the output from the motion sensor of the auxiliary sensor module and a second threshold.

According to this configuration, since the control unit stops the operation of the auxiliary sensor module (the stop mode) in the overall operation mode in which the sensing device performs a normal operation, it is possible to further reduce power consumption. An inexpensive sensor can be selected as the auxiliary sensor module. The problem of an increase in cost in the invention of Patent Document 2 does not occur.

When the motion sensors are included in the sensor module and the auxiliary sensor module, it is possible to determine the operation mode on the basis of the output of the motion sensor of the sensor module during the overall operation mode. This makes it possible to stop the auxiliary sensor module and further suppress power consumption.

A method in which the control unit switches the operation mode is the same as that explained above. It is possible to surely shift the operation mode with little misdetermination.

(7) The sensing device may include a data generating unit that generates, at a given rate, output data based on an output from the group of sensors. The data generating unit may switch the given rate on the basis of the mode control signal.

According to this configuration, since the rate of the output data generated by the data generating unit is adjusted on the basis of the mode control signal, it is possible to suppress power consumption.

The data generating unit generates, from a signal based on the output of the group of sensors, output data used on the inside or the outside of the sensing device. For example, during the operation of the sensing device, it is necessary to generate output data at every clock. However, when the sensing device is not operating, since a part of functions are not used, in some case, it is sufficient to generate one data at every four clocks. In such a situation, the data generating unit determines on the basis of a mode control signal whether the sensing device is operating and switches the rate. This makes it possible to suppress power consumption.

The data generating unit may switch the rate at multiple stages according to not only the mode control signal but also an elapsed time, other input signals, or the like. For example, it is also possible that several rates are prepared and, as a state in which the sensing device is not operating lasts long, the rate is lowered stepwise and power consumption is reduced stepwise.

(8) In the sensing device, the data generating unit may set the given rate to a first rate when the operation mode is the overall operation mode and may set the given rate to a second rate lower than the first rate when the operation mode is other than the overall operation mode.

According to this configuration, the two rates (the first rate and the second rate) are associated with the operation mode of the sensor module. This makes it possible to simplify the control in the data generating unit and reduce a circuit size.

The data generating unit outputs output data at the first rate (a high rate) when the operation mode of the sensor module is the overall operation mode and, when the operation mode of the sensor module is other than the overall operation mode, determines that the sensing device is not performing a normal operation and outputs the output data at the second rate (a low rate).

(9) The sensing device may include a register unit including a status register that represents a rate at which the output data is generated. The data generating unit may update the status register when the rate changes.

According to this configuration, the rate of the output data generated by the data generating unit is reflected on the status register. Therefore, even a device (e.g., a system control unit) on the outside of the sensing device can learn a state of the rate simply by accessing the status register.

(10) In the sensing device, the data generating unit may output an interrupt signal when the status register is updated.

According to this configuration, when the rate of the output data generated by the data generating unit changes, it is also possible to inform the device on the outside of the sensing device of the change using the interrupt signal. Therefore, the device on the outside can access the status register only when necessary. The efficiency of processing is improved.

(11) In the sensing device, the data generating unit may output a signal representing the rate at which the output data is generated.

According to this configuration, the rate of the output data generated by the data generating unit is output as a signal. Therefore, devices on the inside and the outside of the sensing device that receive the signal can always grasp a state of the rate.

(12) Yet another aspect of the invention is directed to an electronic apparatus including the sensing device.

According to this configuration, it is possible to provide an electronic apparatus with power consumption suppressed.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention are explained below with reference to the accompanying drawings.

1. First Embodiment

A first embodiment of the invention is explained with reference to FIGS. 1 to 5.

1.1. Configuration of a Sensor Module

Figure 1:
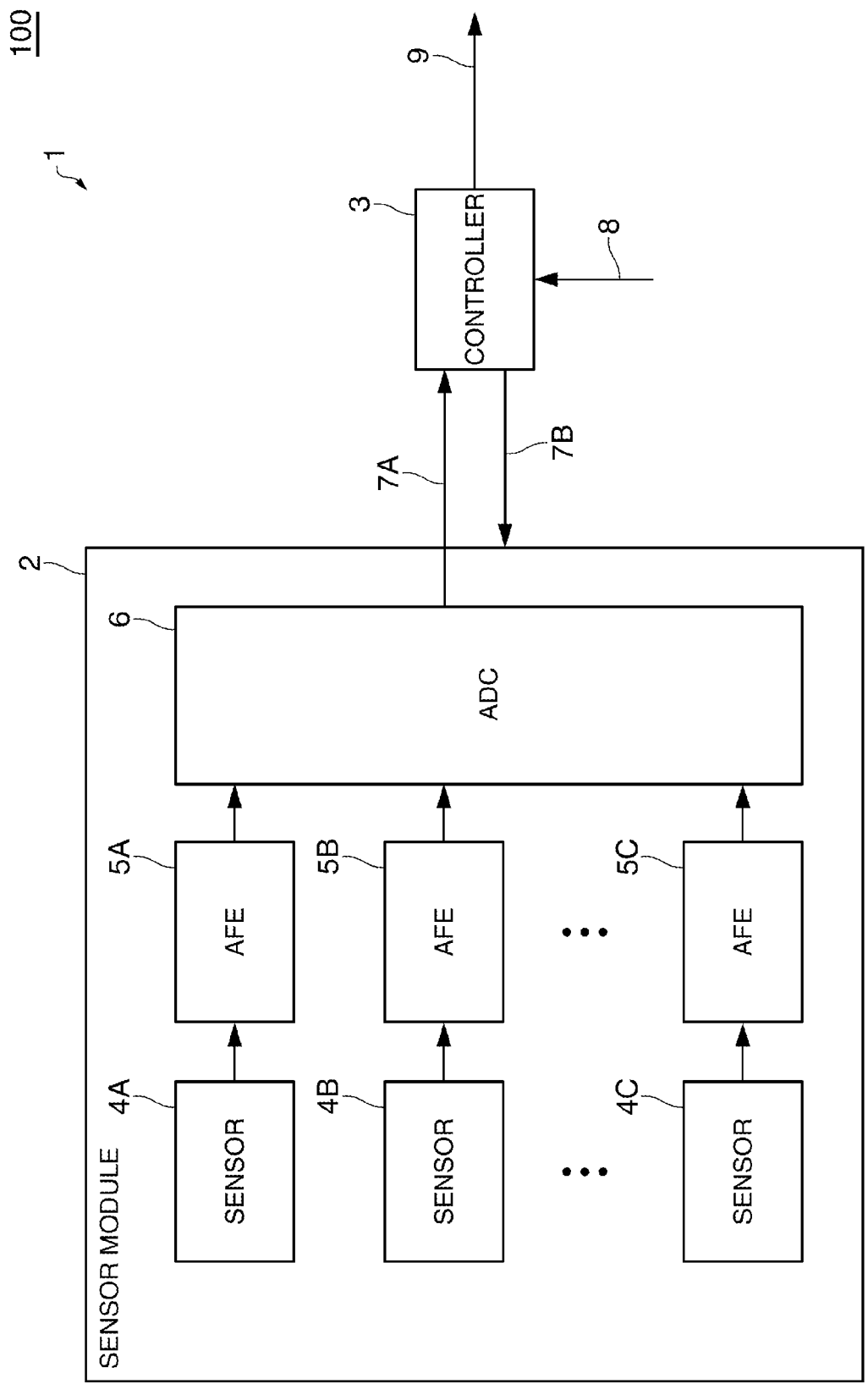
FIG. 1 is a diagram for explaining a sensor module in a first embodiment.

FIG. 1 is a block diagram of a part 1 of a sensing device 100. The sensing device 100 in the first embodiment includes at least a sensor module 2 and a controller 3.

The sensor module 2 includes a group of sensors 4A to 4C, which are plural sensors. The sensor module 2 may include analog front ends (AFEs) 5A to 5C that perform signal amplification and the like and an AD converter (ADC) 6 that converts an analog amount into a digital value.

In this embodiment, at least one of the group of sensors 4A to 4C is a motion sensor. The motion sensor indicates a sensor that detects motion such as an acceleration sensor or a gyro sensor.

In FIG. 1, for example, the sensor 4A may be the motion sensor and the other sensors 4B and 4C may be any one of or a combination of a temperature and humidity sensor, a pressure sensor, a magnetic sensor, and a tactile sensor. For example, all of the group of sensors 4A to 4C may be motion sensors and configure a three-dimensional acceleration sensor or a triaxial gyro sensor. For example, the sensor 4A alone may function as a one-dimensional acceleration sensor or a uniaxial gyro sensor.

The AFEs 5A to 5C may respectively amplify outputs (e.g., analog signals) from the sensors 4A to 4C. In this embodiment, the amplified analog signal is converted into a digital signal using the ADC 6 of a successive approximation type. Since only one ADC 6 is provided for the group of sensors 4A to 4C, conversion processing is performed in a time division manner. The sensor module 2 may include plural ADCs respectively corresponding to the AFEs 5A to 5C.

A sensor module output signal 7A output from the ADC 6 is a signal based on outputs of the group of sensors 4A to 4C. The sensor module output signal 7A is output to the controller 3. A mode control signal 7B for determining an operation mode of the sensor module 2 may be sent from the controller 3 to all components of the sensor module 2 or a part of the components.

The controller 3 controls the operation mode of the sensor module 2 on the basis of an output from the motion sensor. In this embodiment, the operation mode of the sensor module 2 includes at least an overall operation mode and a partial operation mode. The controller 3 may be a CPU or a microcomputer.

When the controller 3 causes the sensor module 2 to operate in the overall operation mode, all of the group of sensors 4A to 4C operate. However, when the controller 3 causes the sensor module 2 to operate in the partial operation mode, only a part of the group of sensors 4A to 4C operate. Even in the partial operation mode, at least one motion sensor is operating.

When the sensor module 2 is operating in the partial operation mode, power consumption is suppressed. At this point, power supply to the sensors not in operation may be stopped or only output of signals to the sensors not in operation may be suppressed. The AFEs at post stages of the sensors not in operation may be stopped in association with the stop of the power supply or the stop of the output of the signals.

For example, it is assumed that the sensors 4A to 4C among the group of sensors of the sensor module 2 configure a three-dimensional acceleration sensor. During a normal operation (the overall operation mode), outputs from these sensors are amplified by the AFEs 5A to 5C, converted into digital signals in a time division manner by the ADC 6, and output to the controller 3.

However, in the partial operation mode, for example, only the sensor 4A is operating and the other sensors 4B and 4C stop. The AFEs 5B and 5C also stop in association with the stop of the sensors 4B and 4C. An output from the sensor 4A is amplified by the AFE 5A, converted by the ADC 6, and output to the controller 3. In the partial operation mode, except the function of the one-dimensional acceleration sensor by the sensor 4A, the other sensors are stopped. Therefore, power consumption decreases.

1.2. Configuration of the Controller

Figure 2:
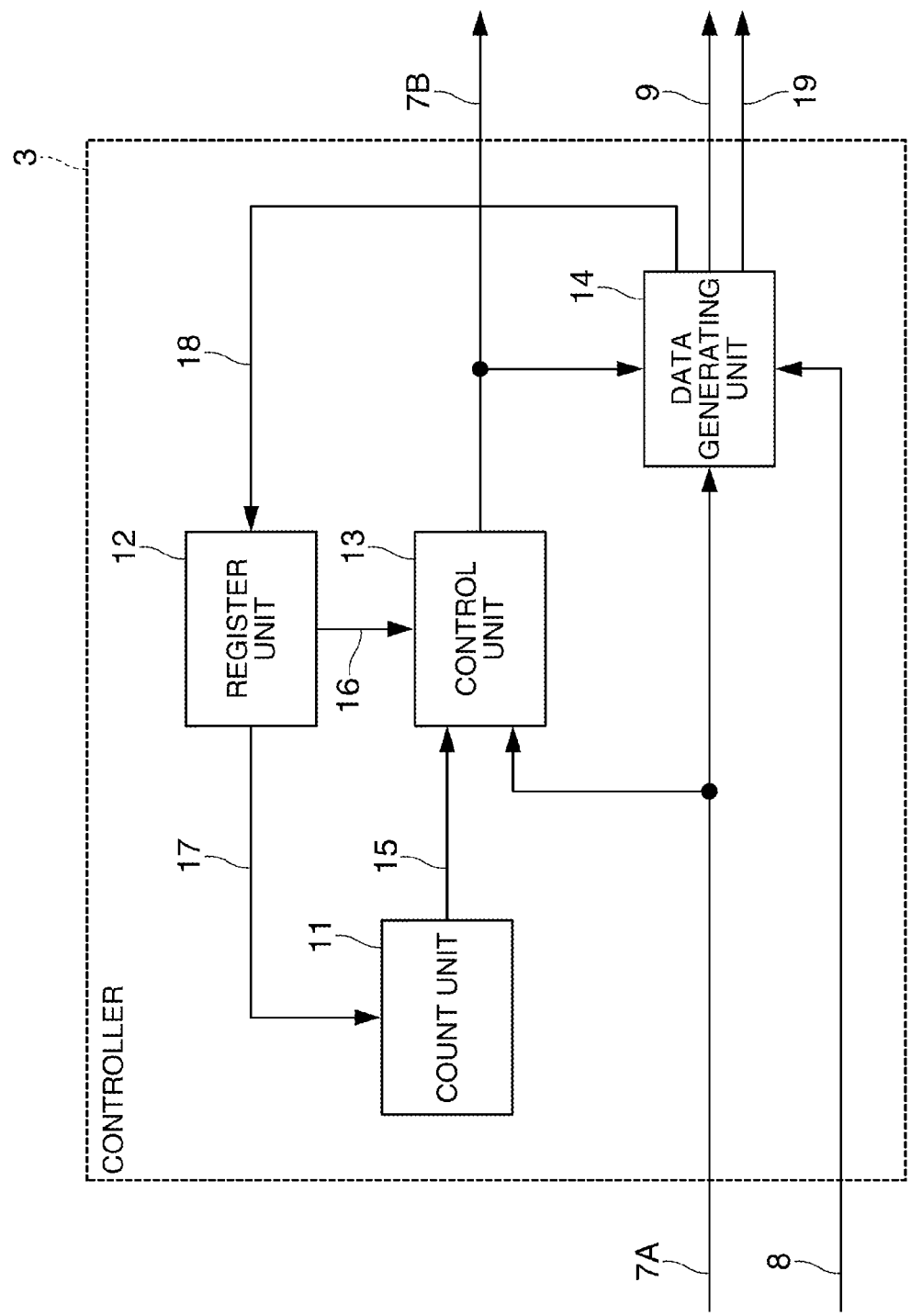
FIG. 2 is a diagram for explaining a controller in the first embodiment.

FIG. 2 is a block diagram of the controller 3 in the first embodiment. Switching of the overall operation mode and the partial operation mode is explained with reference to the block diagram. Components same as those shown in FIG. 1 are denoted by the same reference numerals and signs and explanation of the components is omitted.

In this example, the controller 3 includes a count unit 11, a register unit 12, and a control unit 13. The controller 3 may further include a data generating unit 14. As explained above, the controller 3 may be, for example, a CPU.

The count unit 11 includes a counter that measures a determination time used for determination of the operation mode. The counter may be periodically reset on the basis of the determination time. The counter can measure a given time. The control unit 13 may learn the determination time according to a count value 15 from the count unit 11 and determine from which of the sensors the sensor module output signal 7A is output.

The register unit 12 stores a first threshold and a second threshold, which are thresholds for the switching of the overall operation mode and the partial operation mode. The register unit 12 may store the determination time and inform the count unit 11 of the determination time using an internal signal 17.

The control unit 13 may acquire the count value 15 from the count unit 11 and acquire threshold information 16 from the register unit 12. The control unit 13 extracts signals concerning the motion sensor (motion sensor output signals) in the sensor module output signal 7A, performs comparison processing for the motion sensor output signals with a threshold, outputs the mode control signal 7B for designating the overall operation mode or the partial operation mode. In an example explained below, it is assumed that, as explained above, the normal operation is performed when the sensing device 100 is operating.

When the operation mode of the sensor module 2 is the overall operation mode, if all motion sensor output signals are smaller than the first threshold in the determination time, the control unit 13 determines that the sensing device 100 is not operating and shifts to the partial operation mode.

The determination time may be short. However, in order to carefully determine that the sensing device 100 is not operating, the determination time may be about several seconds or longer than several seconds.

When the operation mode of the sensor module 2 is the partial operation mode, if the motion sensor output signals are larger than the second threshold, the control unit 13 determines that the sensing device 100 is operating and shifts to the overall operation mode.

When the sensing device 100 starts operation, it is desirable that the sensing device 100 immediately shifts to the normal operation mode. Therefore, when the motion sensor output signals exceed the second threshold, the sending device 100 may immediately shift to the overall operation mode. However, in order to eliminate the influence of noise, the control unit 13 may average several data and compare the averaged data with the second threshold.

In this way, the control unit 13 determines the operation mode and outputs the mode control signal 7B to the sensor module 2.

The controller may include the data generating unit 14. The data generating unit 14 may perform an arithmetic operation using the sensor module output signal 7A and arithmetic operation parameters 8. The data generating unit 14 may change contents of arithmetic processing and a rate of generation of an output signal 9 according to the mode control signal 7B from the control unit 13. The data generating unit 14 may output a state output signal 19 representing information concerning the output data 9 and the rate to the outside of the controller 3. Further, when the rate is changed, the data generating unit 14 may update a status register of the register unit 12 according to an internal signal 18 and inform the outside of the controller 3 of a state of the rate.

1.3. Overall Configuration of the Sensing Device

Figure 3:
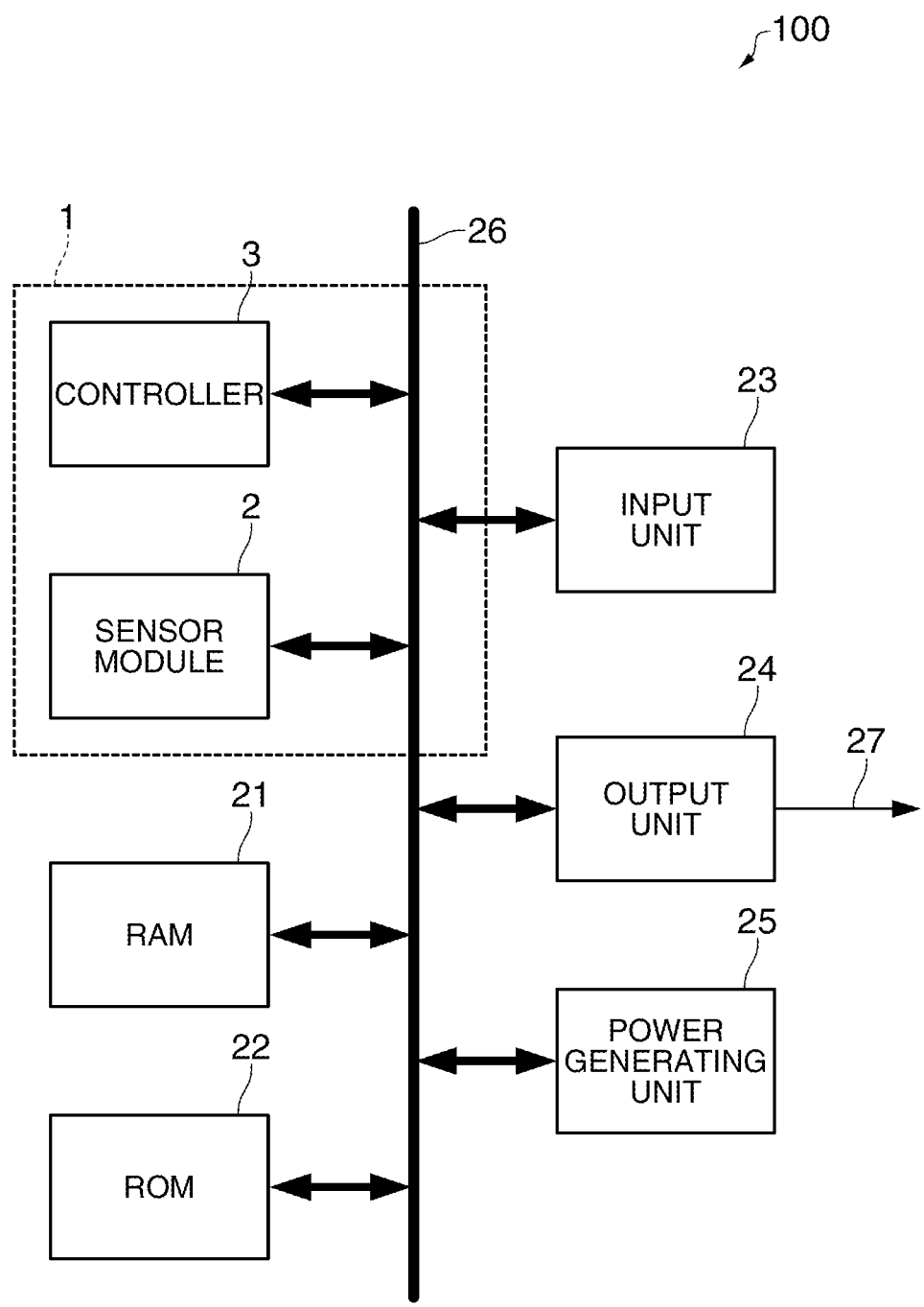
FIG. 3 is a diagram of a sensing device in the first embodiment.

FIG. 3 is a diagram showing the sensing device 100 in the first embodiment. Components same as those shown in FIGS. 1 and 2 are denoted by the same reference numerals and signs and explanation of the components is omitted.

The sensing device 100 may include, besides a configuration 1 in FIG. 1 indicated by a dotted line, a random access memory (RAM) 21, a read only memory (ROM) 22, an input unit 23, an output unit 24, and a power generating unit 25. These components may be capable of inputting and outputting addresses, data, and the like to and from one another or in a determined direction through a bus 26. The bus 26 may be, for example, an I²C bus or an SPI (Serial Peripheral Interface) bus.

The RAM 21 stores a computer program, various parameters, temporary data, and the like. For example, when the controller 3 is a CPU, the RAM 21 may store a computer program used by the CPU. The RAM 21 may store the arithmetic operation parameters 8 (see FIG. 2).

The ROM 22 is a nonvolatile memory and stores a computer program and various parameters necessary for the sensing device 100. Data and the like may be written in the RAM 21 when the sensing device 100 is started.

The input unit 23 receives an input from the outside of the sensing device 100. For example, when the register unit 12 prepares a register for setting the first threshold, the second threshold, the determination time, and the like, a user may set values of the first threshold, the second threshold, the determination time, and the like using the input unit 23.

The output unit 24 outputs a signal to the outside of the sensing device 100. For example, the output unit 24 may output the output data 9 and the state output signal 19 (see FIG. 2) of the controller 3 as an output signal 27.

The power generating unit 25 generates power used in the sensing device 100. For example, the power generating unit 25 separately prepares a power supply for a part of the sensors among the group of sensors 4A to 4C (see FIG. 1) of the sensor module 2 and a power supply for the other sensors. When the operation mode is the partial operation mode, the power generating unit 25 may stop power supply to sensors not in operation.

1.4. Explanation of a Waveform Chart

Figure 4:
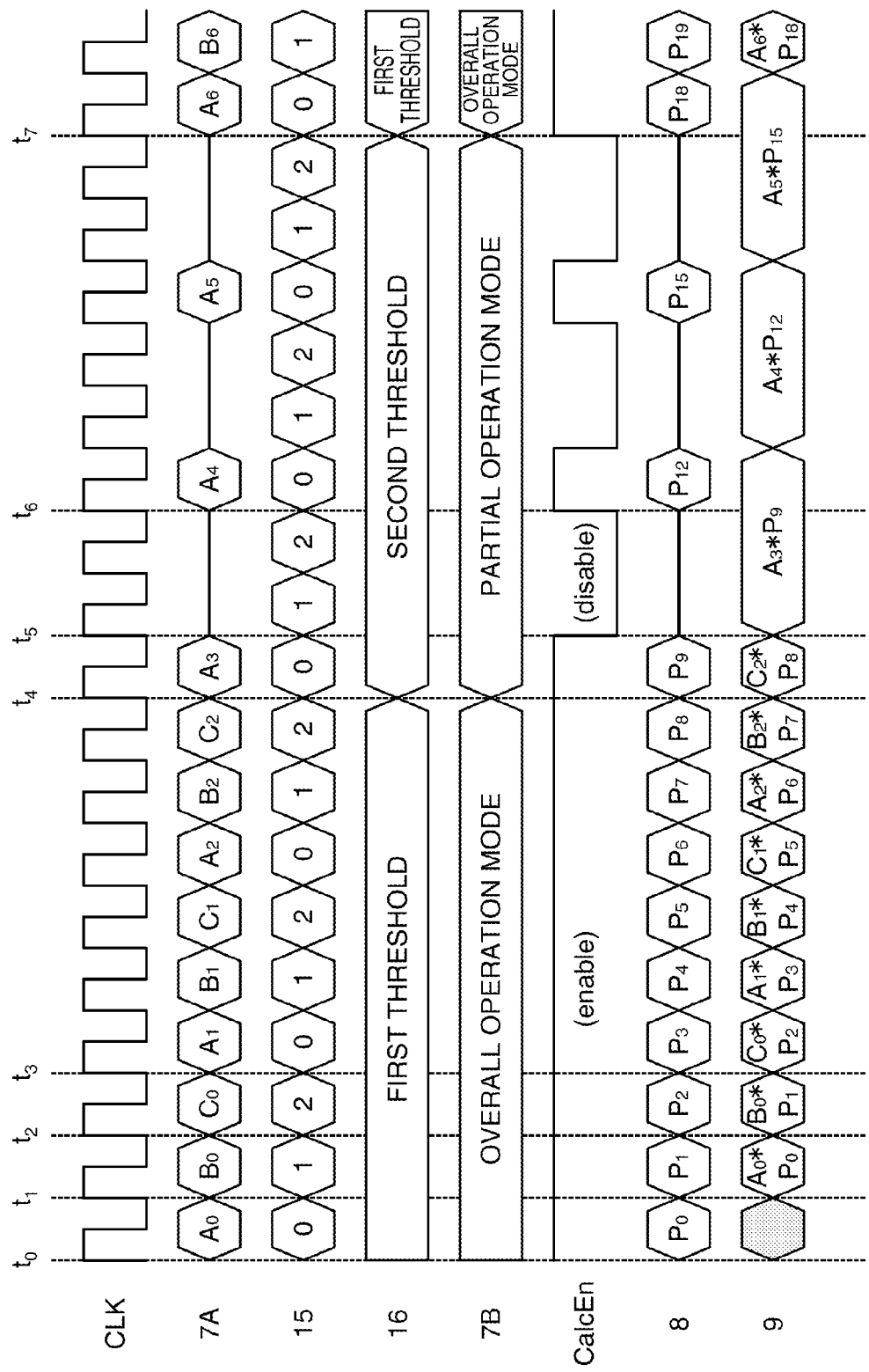
FIG. 4 is a waveform chart in the first embodiment.

FIG. 4 shows a waveform chart in the first embodiment. Reference numerals and signs in the waveform chart correspond to those in FIGS. 1 to 3. CLK represents a clock signal. In this example, assuming that the group of sensors include three motion sensors 4A, 4B, and 4C, a change in the mode control signal 7B is explained. CalcEn represents an enable signal for generating output data in the data generating unit 14.

The control unit 13 acquires the first threshold and the second threshold from the register unit 12 as the threshold information 16. In this example, the control unit 13 compares the first threshold and the second threshold with the sensor module output signal 7A, which is the motion sensor output signal, and generates the mode control signal 7B.

As the count value 15, in this example, values of 0 to 2 are repeated because three clocks are the determination time.

Further, when the data generating unit 14 is included, the data generating unit 14 may set, according to the mode control signal 7B, a rate for generating the output data 9 and control CalcEn according to the set rate. The data generating unit 14 may read the necessary arithmetic parameters 8.

A change in the mode control signal 7B output by the control unit 13 is explained below. The generation of the output data 9 is explained in an embodiment explained later.

At time t0, the operation mode of the sensor module 2 is the overall operation mode. In the overall operation mode, the control unit 13 compares the motion sensor output signal (in this example, same as the sensor module output signal 7A) and the first threshold. If the motion sensor output signal is smaller than the first threshold in the determination time, the control unit 13 determines that the sensing device 100 is not operating and shifts to the partial operation mode.

As the sensor module output signal 7A, signals based on outputs from the three motion sensors 4A, 4B, and 4C converted by the ADC 6 of the successive approximation type are obtained in order. For example, A0 represents data from the motion sensor 4A (time t0) and B0 and C0 respectively represent data from the motion sensors 4B and 4C (time t1 to time t2). In the overall operation mode, the signals based on the outputs from the motion sensors 4A, 4B, and 4C are repeated at every one clock.

In this example, the determination time is the time equivalent to three clocks as explained above. At time t0 to time t3, if each of the data A0 to C0 is smaller than the first threshold, the control unit 13 shifts the operation mode of the sensor module 2 to the partial operation mode according to the mode control signal 7B. If the condition is not satisfied, the control unit 13 causes the sensor module 2 to continue the overall operation mode. In this example, although the data A0 to C0 and A1 to C1 do not satisfy the condition, data A2 to C2 are smaller than the first threshold. Therefore, after the data C2, the control unit 13 shifts the operation mode to the partial operation mode according to the control signal 7B (time t4).

The control unit 13 may perform the determination of the operation mode according to other methods. For example, at time t0 to time t3, the control unit 13 may compare an average of the obtained data A0 to C0 ((A0+B0+C0)/3) and the first threshold and determine the operation mode. Thereafter, the control unit 13 may calculate averages ((A1+B1+C1)/3) and ((A2+B2+C2)/3) and compare the averages with the first threshold.

When the operation mode of the sensor module 2 changes to the partial operation mode, the motion sensors 4B and 4C stop and the sensing device 100 changes to the low power consumption state. At this point, in order to determine switching to the overall operation mode, signals (A3, A4, and A5) based on an output of the motion sensor 4A are used. As shown in FIG. 4, the data A3 equivalent to one clock is input at time t4 and new data is not input at time t5 to time t6. In the partial operation mode, curtailed data may be input as the sensor module output signal 7A.

The control unit 13 compares the data (A3, A4, and A5) from the motion sensor 4A with the second threshold one by one. If the data is larger than the second threshold, the control unit 13 determines that the sensing device 100 is operating and shifts to the overall operation mode. In this example, the data A5 is larger than the second threshold. After time t7, the operation mode changes to the overall operation mode again. It is assumed that the second threshold is set to a value larger than or same as the first threshold.

In the explanation of this example, it is assumed that the sensors 4A to 4C are the motion sensors. However, when the sensors 4B and 4C are sensors other than the motion sensors, the waveform chart (time t4 to time t7) in the partial operation mode is the same. In this example, the partial operation mode shifts to the overall operation mode at time t7 in alignment with three clocks. However, the partial operation mode may shift to the overall operation mode immediately after the data A5 is compared.

1.5. Flow Chart

Figure 5:
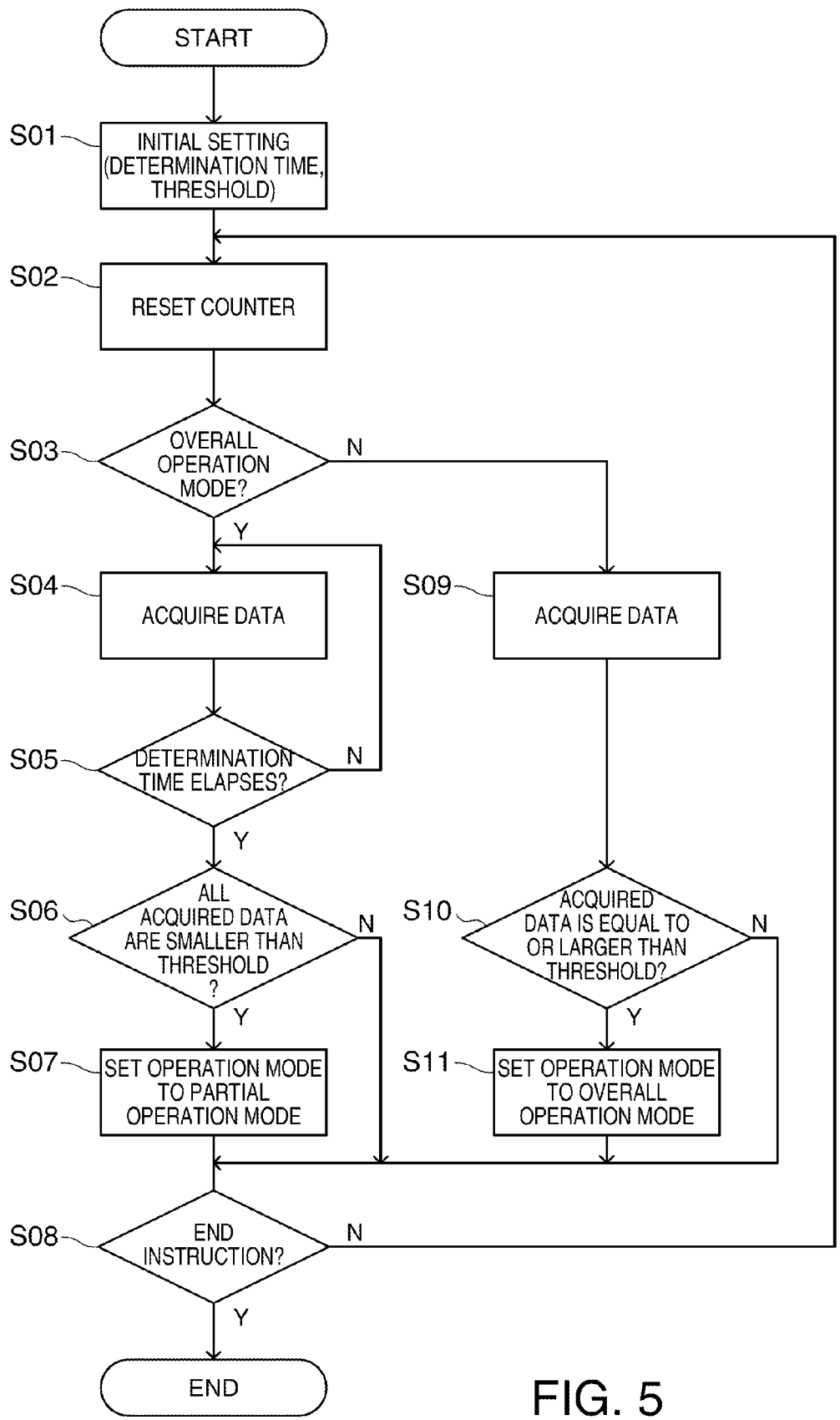
FIG. 5 is a flowchart in the first embodiment.

FIG. 5 shows a flowchart in the first embodiment. The control unit 13 in the first embodiment switches the operation mode of the sensor module 2 according to FIG. 5.

First, initial setting is performed concerning a determination time and a threshold used for determination of switching of the operation mode by the control unit 13 (S01). For example, the initial setting may be storage of the determination time and the threshold in a predetermined register of the register unit 12 from the ROM 22 during the start of the sensing device 100 or may be writing of the determination time and the threshold in the predetermined register by the user through the input unit 23. In the explanation of this example, it is assumed that the threshold used for determination of switching of the operation mode is the same value (since the first threshold and the second threshold are equal, the first threshold and the second threshold are represented as threshold). However, the first threshold may be used in switching from the overall operation mode to the partial operation mode and the second threshold, which is a value different from the first threshold, may be used in the opposite switching.

Subsequently, the control unit 13 resets a counter for measuring elapse of the determination time (S02). In this embodiment, the control unit 13 resets the counter of the count unit 11.

The control unit 13 checks the operation mode (S03) and performs different operation according to the operation mode. In this embodiment, it is assumed that the sensing device 100 is in the overall operation mode during the start of the sensing device 100 (Y in S03).

The control unit 13 repeatedly performs, until the determination time elapses (N in S05), acquisition of data used for determination concerning whether the overall operation mode is shifted to the partial operation mode (S04). When the determination time elapses (Y in S05), the control unit 13 determines switching of the operation mode on the basis of the acquired data. If all the acquired data are smaller than the threshold (Y in S06), the control unit 13 determines that the sensing device 100 is not operating and sets the operation mode of the sensor module 2 to the partial operation mode (S07). If at least one of the acquired data is equal to or larger than the threshold, assuming that the sensing device 100 is likely to be normally operating, the control unit 13 keeps the operation mode of the sensor module 2 in the overall operation mode (N in S06).

On the other hand, when the sensing device 100 is in the partial operation mode (N in S03), after one data is acquired (S09), the control unit 13 immediately determines whether the data is equal to or larger than the threshold (S10). When the data is equal to or larger than the threshold (Y in S10), the control unit 13 determines that the sensing device 100 resumes the normal operation. The control unit 13 immediately performs setting to return the partial operation mode to the overall operation mode (S11). When the data is smaller than the threshold, the control unit 13 continues the low power consumption state while maintaining the partial operation mode (N in S10).

After determining the switching of the operation mode on the basis of the acquired data, if no end instruction is received from a computer program or the user, the control unit 13 returns to S02 and repeats the operation and the determination (N in S08). If an end instruction is received, the control unit 13 ends the processing (Y in S08).

2. Second Embodiment

A second embodiment of the invention is explained with reference to FIGS. 6 to 11. In the second embodiment, an auxiliary sensor module is used in addition to the configuration in the first embodiment. By using the auxiliary sensor module, an operation mode of a sensor module can be switched to a stop operation mode for stopping at least a part of a group of sensors. When the operation mode is switched to the stop operation mode, power consumption can be suppressed. As the auxiliary sensor module, an inexpensive sensor can be selected and a problem of an increase in cost does not occur. Even when the group of sensors of the sensor module does not include a motion sensor, low power consumption can be realized without changing design.

2.1. Configuration of the Auxiliary Sensor Module

Figure 6:
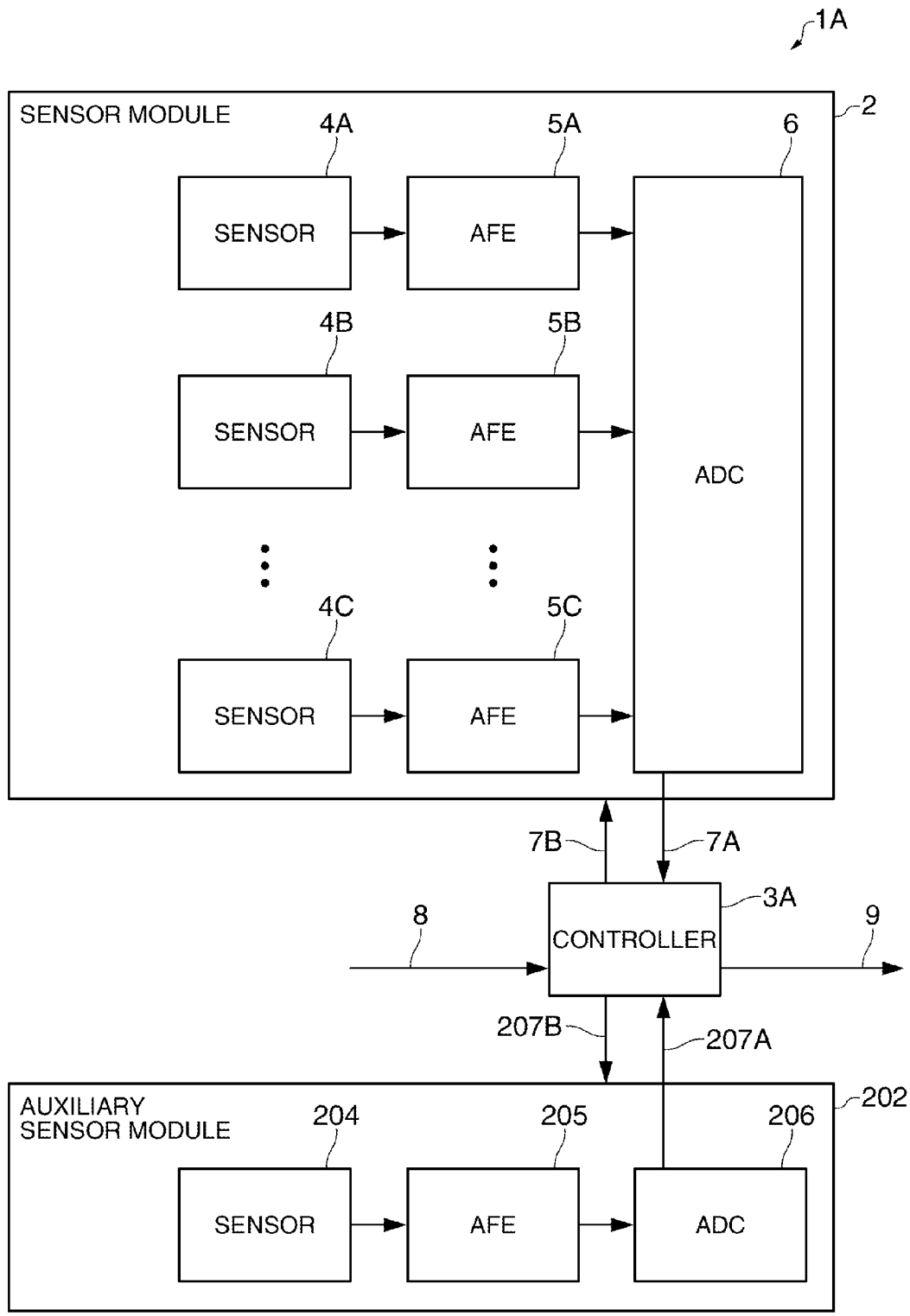
FIG. 6 is a diagram for explaining an auxiliary sensor module in a second embodiment.

FIG. 6 is a block diagram of a part 1A of a sensing device 100A. An auxiliary sensor module 202 in this embodiment is explained with reference to FIG. 6. Components same as those shown in FIG. 1 are denoted by the same reference numerals and signs and explanation of the components is omitted.

The sensing device 100A in this embodiment includes at least the sensor module 2, a controller 3A, and the auxiliary sensor module 202.

The auxiliary sensor module 202 includes at least one motion sensor. In FIG. 6, the sensor 204 is the motion sensor. The auxiliary sensor module 202 includes an analog front end (AFE) 205 that performs signal amplification and the like and an AD converter (ADC) 206 that converts an analog amount into a digital value.

An auxiliary sensor module output signal 207A output from the ADC 206 is a signal based on an output of the sensor 204. The auxiliary sensor module output signal 207A is output to the controller 3A. A stop instruction signal 207B from the controller 3A is a signal independent from the mode control signal 7B to the sensor module 2. The controller 3A can stop all or a part of the components of the auxiliary sensor module 202 (a stop mode) or cause all or a part of the components to operate (an operation mode) according to the stop instruction signal 207B.

The auxiliary sensor module 202 may be a module having functions reduced from the functions of the sensor module 2. The auxiliary sensor module 202 desirably consumes low power and is inexpensive. By using the auxiliary sensor module 202, as explained below, low power consumption of the sensing device 100A can be realized without performing a design change or the like concerning the existing sensor module 2.

In this embodiment, the controller 3A switches the operation mode to the stop operation mode instead of the partial operation mode in the first embodiment. In the stop operation mode, the controller 3A stops the group of sensors of the sensor module 2 and performs control on the basis of a signal from the motion sensor of the auxiliary sensor module 202. In the stop operation mode, since the auxiliary sensor module 202 is caused to operate rather than the sensor module 2, power consumption decreases.

The auxiliary sensor module 202 may always continue to operate. The controller 3A determines switching of the operation mode on the basis of only the auxiliary sensor module output signal 207A. In this case, it is possible to deal with the determination of the switching of the operation mode even if the group of sensors of the sensor module 2 do not include a motion sensor at all.

On the other hand, when the group of sensors of the sensor module 2 include at least one motion sensor, in the overall operation mode, the controller 3A may stop the operation of the auxiliary sensor module 202 (the stop mode) and further suppress power consumption. This is because, in the overall operation mode, the controller 3A can determine switching of the operation mode according to the sensor module output signal 7A as in the first embodiment.

2.2. Configuration of the Controller

Figure 7:
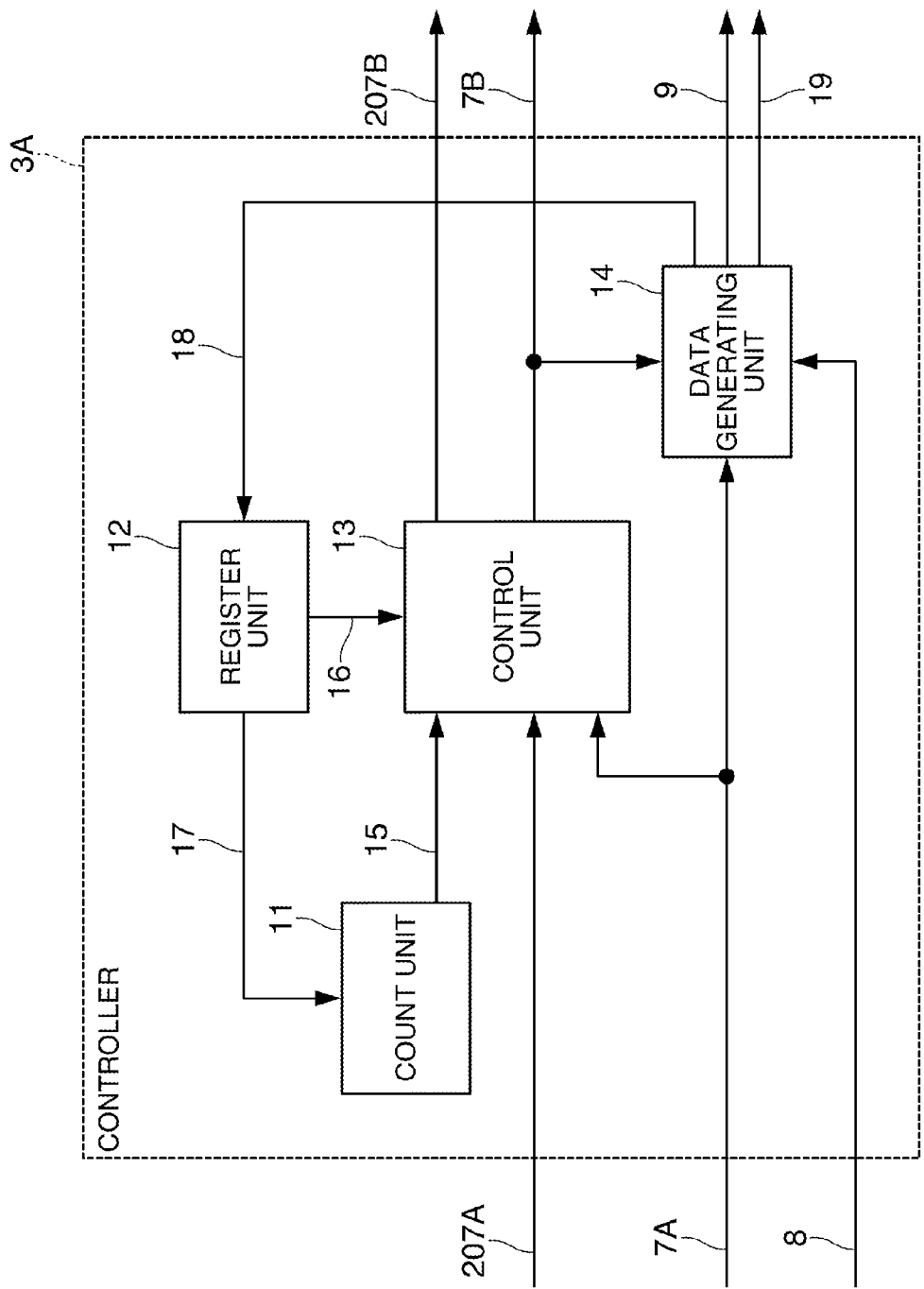
FIG. 7 is a diagram for explaining a controller in the second embodiment.

FIG. 7 is a block diagram of the controller 3A in the second embodiment. Components same as those shown in FIG. 2 are denoted by the same reference numerals and signs and explanation of the components is omitted.

The configuration of the controller 3A is substantially the same as that shown in FIG. 2. However, a control unit 13A receives not only the sensor module output signal 7A but also the auxiliary sensor module output signal 207A.

The control unit 13A outputs not only the mode control signal 7B but also a stop instruction signal 207B for causing all or apart of the components of the auxiliary sensor module 202 to stop and operate. The stop instruction signal 207B may be a signal for instructing the stop when a signal level is LO and instructing the operation when the signal level is HI.

2.3. Overall Configuration of the Sensing Device

Figure 8:
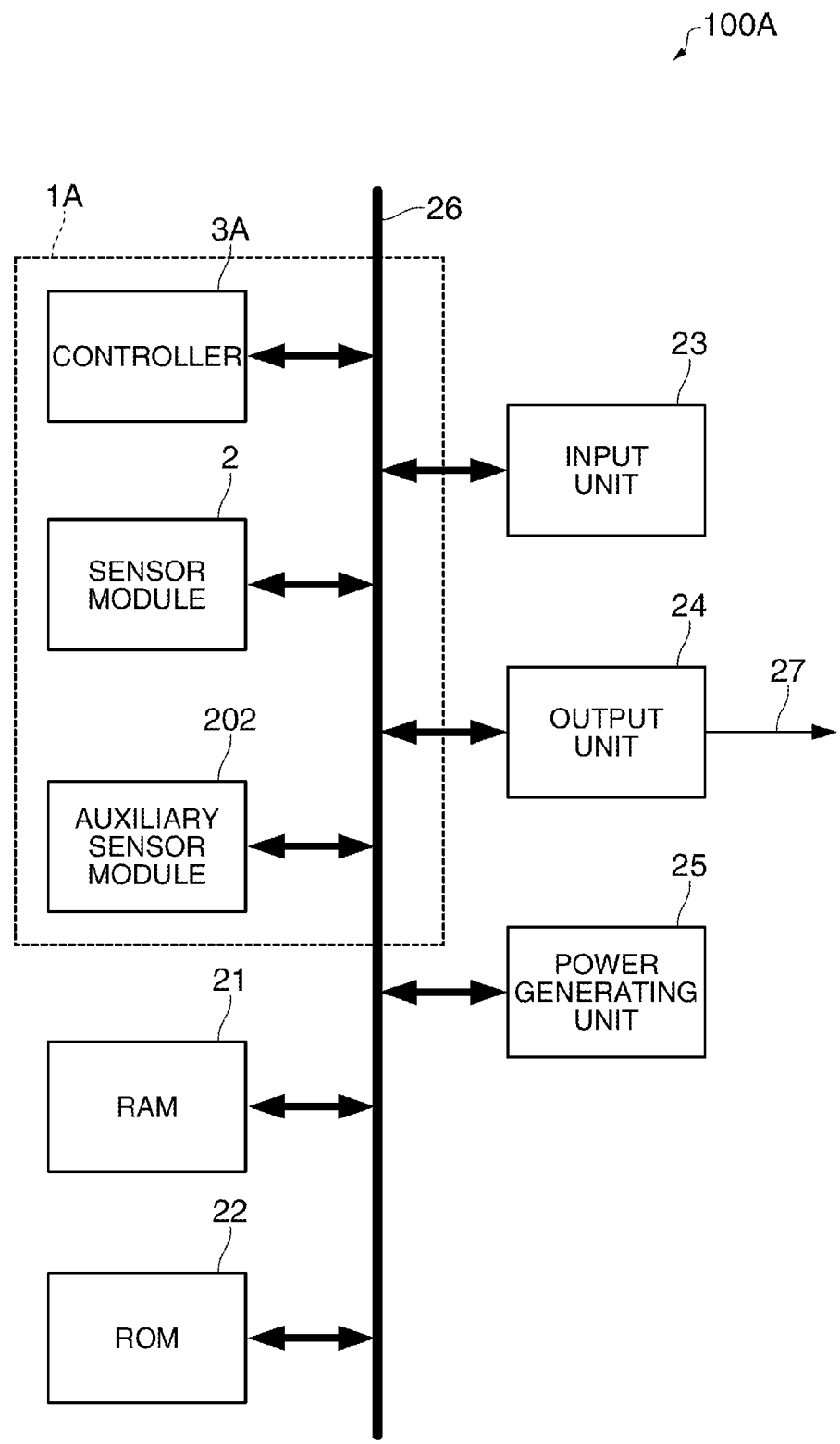
FIG. 8 is a diagram showing a sensing device in the second embodiment.

FIG. 8 is a diagram showing the sensing device 100A in the second embodiment. Components same as those shown in FIG. 3 are denoted by the same reference numerals and signs and explanation of the components is omitted. The sensing device 100A is different from the sensing device 100 in the first embodiment in that the auxiliary sensor module 202 is added.

2.4. Explanation of a Waveform Chart

Figure 9:
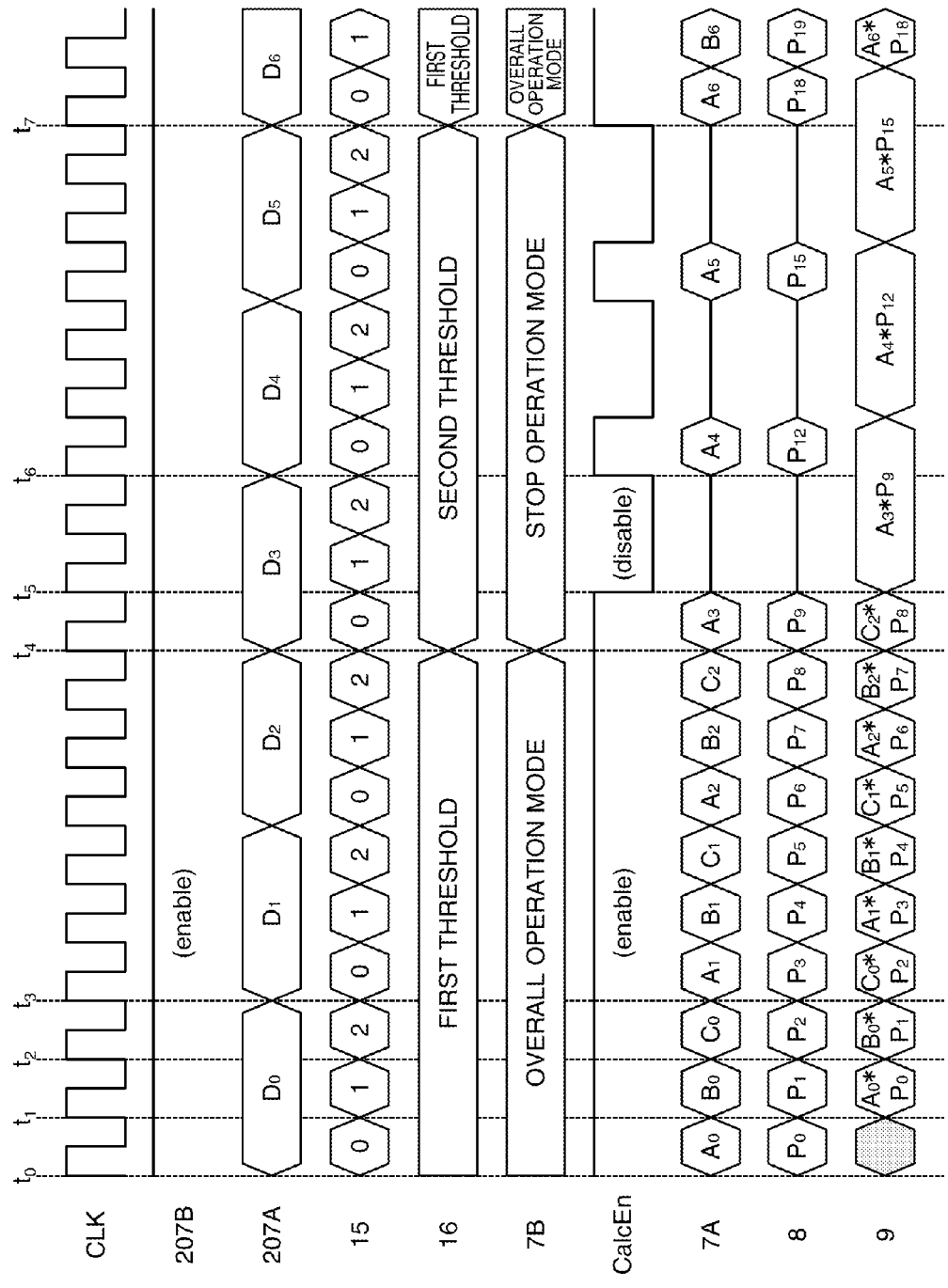
FIG. 9 is a waveform chart in the second embodiment.
Figure 10:
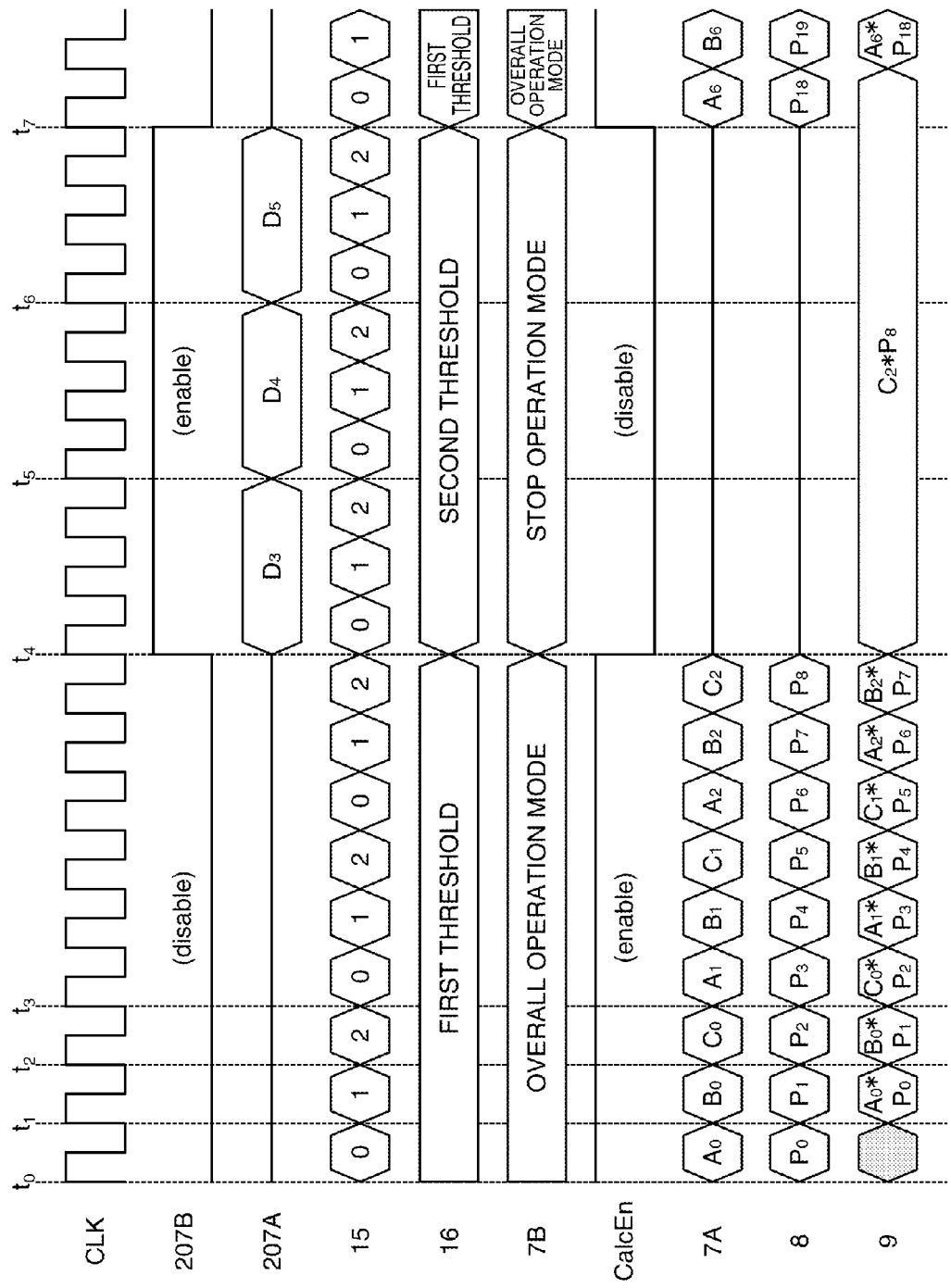
FIG. 10 is a waveform chart in a modification of the second embodiment.

FIGS. 9 and 10 show waveform charts in the second embodiment. Reference numerals and signs in the waveform charts correspond to those in FIGS. 6 to 8. A notation system and the like are the same as those in FIG. 4 and detailed explanation thereof is omitted.

FIG. 9 is an example of a waveform chart obtained when the auxiliary sensor module 202 always continues to operate. The control unit 13A determines switching of the operation mode on the basis of the auxiliary sensor module output signal 207A. The stop instruction signal 207B instructs the auxiliary sensor module 202 to stop when a signal level is LO and instructs the auxiliary sensor module 202 to operate when the signal level is HI. In FIG. 9, the signal level remains HI and the auxiliary sensor module 202 continues to operate.

As explained with reference to FIG. 4, the control unit 13A acquires the first threshold and the second threshold from the register unit 12 as the threshold information 16. In this example, the control unit 13A compares the first threshold and the second threshold with the auxiliary sensor module output signal 207A and generates the mode control signal 7B. As the count value 15, values 0 to 2 are repeated to indicate a determination time.

When the data generating unit 14 is included, the data generating unit 14 may set, according to the mode control signal 7B, a rate for generating the output data 9 and control CalcEn according to the set rate. The data generating unit 14 may read the necessary arithmetic operation parameters 8.

A change in the mode control signal 7B output by the control unit 13A is explained below. The generation of the output data 9 is explained in an embodiment explained later.

At time t0 to time t4, the operation mode is the overall operation mode. In this period, as in the first embodiment, signals based on outputs from the sensors 4A, 4B, and 4C are obtained in order at every one clock (e.g., t0, t1, and t2). The sensors 4A, 4B, and 4C may be sensors other than the motion sensor. The control unit 13A compares data D0, D1, and D2 of the auxiliary sensor module output signal 207A and the first threshold. In FIG. 9, although the data D0 and D1 are equal to or larger than the first threshold, the data D2 is smaller than the first threshold. Therefore, the operation mode after the data D2 is switched to the stop operation mode (time t4).

During the stop operation mode, since a part of the group of sensors are stopped, the power consumption of the sensing device 100A decreases (time t4 to time t7). The control unit 13A compares data D3, D4, and D5 of the auxiliary sensor module output signal 207A and the second threshold. Since the data D5 of the auxiliary sensor module output signal 207A is larger than the second threshold, the operation mode is switched to the overall operation mode after the data D5 (time t7).

In this example, the controller 3A uses only the auxiliary sensor module output signal 207A for determination of switching of the operation mode. Therefore, as explained above, the motion sensor does not have to be included in the group of sensors of the sensor module 2.

FIG. 10 is an example of a waveform chart obtained when the auxiliary sensor module 202 operates exclusively from the sensor module 2. When the group of sensors of the sensor module 2 include at least one module sensor, in the overall operation mode, the controller 3A can cause the auxiliary sensor module 202 to stop. Therefore, it is possible to further suppress power consumption. Signals shown in FIG. 10 are the same as those shown in FIG. 9 and explanation of the signals is omitted.

In the overall operation mode (time t0 to time t4), the controller 3A determines switching of the operation mode on the basis of a signal from the motion sensor included in the group of sensors of the sensor module 2. For example, the sensor 4C is the motion sensor and the data C2 is smaller than the first threshold. Therefore, the operation mode is switched to the stop operation mode after the data C2 (time t4).

In this example, all of the group of sensors of the sensor module 2 are stopped during the stop operation mode. The power consumption of the sensing device 100A can be reduced to the smallest power consumption (time t4 to time t7). In the period, the auxiliary sensor module output signal 207A is used for determination of the operation mode and the data D5 of the auxiliary sensor module output signal 207A is larger than the second threshold. Therefore, the operation mode is switched to the overall operation mode after the data D5 (time t7). In this example, the stop instruction signal 207B switches the operation and the stop of the auxiliary sensor module 202 in association with the mode control signal 7B.

2.5. Flowchart

Figure 11:
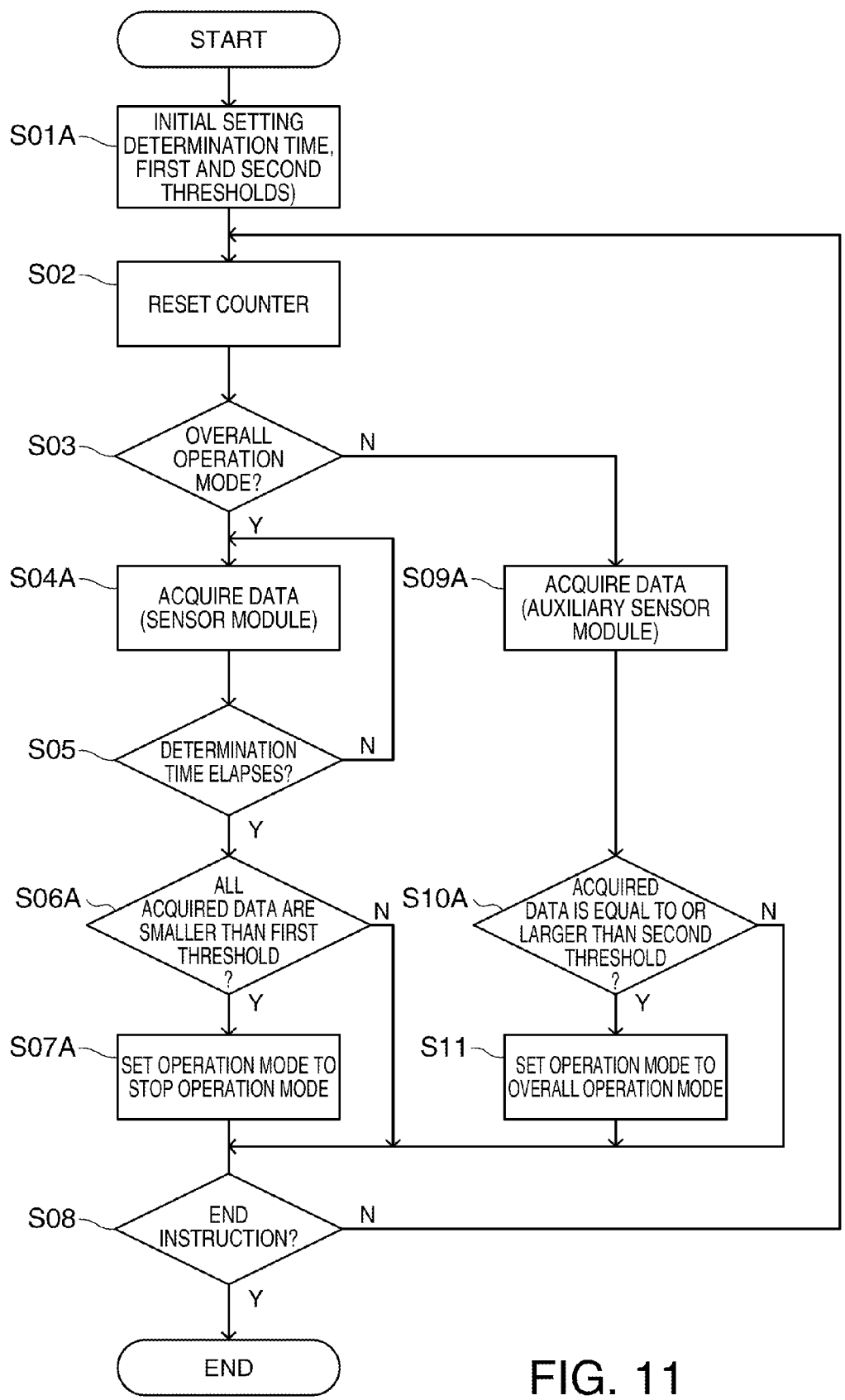
FIG. 11 is a flowchart in the second embodiment.

FIG. 11 shows a flowchart in the second embodiment. The control unit 13A in the second embodiment switches the operation mode of the sensor module 2 according to FIG. 11. Steps same as those shown in FIG. 5 are denoted by the same reference signs and explanation of the steps is omitted.

First, initial setting is performed concerning a determination time and a threshold used for determination of switching of the operation mode by the controller 3A (S01A). In this example, it is assumed that the first threshold is used in switching from the overall operation mode to the stop operation mode and the second threshold, which is different from the first threshold, is used in opposite switching. In the following explanation, it is assumed that an exclusive operation of the sensor module 2 and the auxiliary sensor module 202 corresponding to the waveform chart of FIG. 10 is performed.

In the case of the overall operation mode (Y in S03), in order to obtain materials for determining whether the overall operation mode is switched to the stop operation mode, the control unit 13A repeatedly performs acquisition of data (S04A) until the determination time elapses (N in S05). The data indicates an output of the motion sensor included in the sensor module 2.

When the determination time elapses (Y in S05), the control unit 13A determines switching of the operation mode on the basis of the acquired data. If all the acquired data are smaller than the first threshold (Y in S06A), the control unit 13A determines that the sensing device 100A is not operating and sets the operation mode of the sensor module 2 to the stop operation mode (S07A). If at least one of the acquired data is equal to or larger than the first threshold, assuming that the sensing device 100A is likely to be normally operating, the control unit 13A keeps the operation mode of the sensor module in the overall operation mode (N in S06A).

On the other hand, when the sensing device 100A is in the stop operation mode (N in S03), after acquiring data from the auxiliary sensor module 202 (S09A), the control unit 13A immediately determines whether the data is equal to or larger than the second threshold (S10A). When the data is equal to or larger than the second threshold (Y in S10A), the control unit 13A determines that the sensing device 100A resumes the normal operation. The control unit 13A immediately performs setting such that the sensing device 100A returns to the overall operation mode (S11). When the data is smaller than the second threshold, the control unit 13A continues the low power consumption state while maintaining the stop operation mode (N in S10A).

Thereafter, if no end instruction is received, the control unit 13A returns to S02 and repeats the operation and the determination (N in S08). If an end instruction is received, the control unit 13A ends the processing (Y in S08).

3. Third Embodiment

A third embodiment of the invention is explained with reference to FIGS. 1 to 4, FIGS. 9 and 10, and FIG. 12. In the third embodiment, a data generating unit generates output data on the basis of an output from a group of sensors. When the output data is generated, a rate for generating the output data is switched on the basis of a mode control signal to further reduce power consumption.

3.1. Main Configuration of a Sensing Device

A sensing device in the third embodiment always includes a data generating unit. Otherwise, the sensing device may be the same as that in the first embodiment or the second embodiment. In the following explanation, it is assumed that the sensing device has a configuration same as that in the first embodiment. The configuration of a part of the sensing device 100 is shown in FIG. 1. The configuration of the controller 3 is shown in FIG. 2. In the third embodiment, the controller 3 always includes the data generating unit 14 and outputs the output data 9 at a certain rate.

The data generating unit 14 reads the necessary arithmetic operation parameters 8 from the RAM 21 or the ROM 22 and performs an arithmetic operation for generating the sensor module output signal 7A and output data.

All outputs of the group of sensors are targets of signals used for generating the output data. This is different from the control unit 13 that switches the operation mode targeting only an output from the motion sensor among the group of sensors.

During the normal operation, the data generating unit 14 outputs the output data 9 at an interval required by the sensing device 100 (at a normal rate). However, when it is determined that devices and the like including the sensing device 100 are not operating, it is unnecessary to output the output data 9 at the normal rate. Therefore, in this embodiment, when the sensor module 2 is operating in the operation mode other than the overall operation mode, the output data 9 is output at a rate lower than the normal rate to suppress power consumption. The state output signal 19 indicating information concerning the present rate may be output.

Since the operation mode of the sensor module 2 changes, the content of the sensor module output signal 7A also changes. Therefore, the data generating unit 14 may change the content of arithmetic processing simultaneously with a change of the rate of the output data 9.

Specifically, the data generating unit 14 adjusts the rate on the basis of the mode control signal 7B from the control unit 13. The data generating unit 14 may adjust the rate at multiple stages according to, for example, an elapsed time after the operation mode is switched. The data generating unit 14 may include a part of the functions of the control unit 13. The data generating unit 14 itself may perform adjustment of the rate on the basis of a signal from the motion sensor rather than according to the mode control signal 7B.

3.2. Overall Configuration of the Sensing Device

The configuration of the sensing device 100 in the third embodiment is shown in, for example, FIG. 3. The output data 9 and the state output signal 19 output from the data generating unit 14 included in the controller 3 may be output from the output unit 24 as the output signal 27 through the bus 26.

3.3. Explanation of a Waveform Chart

The output data 9 is explained with reference to FIG. 4. Since explanation of signals and the like is the same as the explanation in the first embodiment, detailed explanation of the signals and the like is omitted.

The data generating unit 14 sets, according to the mode control signal 7B, a rate for generating the output data 9 and controls CalcEn according to the set rate. The data generating unit 14 reads the necessary arithmetic operation parameters 8 and performs an arithmetic operation. CalcEn is an enable signal for generating output data in the data generating unit 14.

In this example, it is assumed that the output data 9 is a product of the sensor module output signal 7A and the arithmetic operation parameters 8. It is assumed that the output data 9 is generated when the internal signal CalcEn of the data generating unit 14 is enable and that the output data 9 is a register output.

In this example, the data generating unit 14 generates the output data 9 at every one clock in the overall operation mode (time t0 to time t4). On the other hand, in the partial operation mode, the data generating unit 14 generates the output data 9 only when the sensor module output signal 7A is input (e.g., time t4 to t5). In the partial operation mode, since an output rate is low because of the presence of a period in which the output data 9 is not generated (e.g., time t5 to time t6), power consumption is suppressed (time t4 to time t7).

The same holds true when the stop operation mode is used rather than the partial operation mode. For example, in FIGS. 9 and 10, when the operation mode is the stop operation mode (time t4 to time t7), the data generating unit 14 generates the output data 9 only when the sensor module output signal 7A is input. Therefore, in the stop operation mode, since an output rate is low, power consumption is suppressed. In the example shown in FIG. 10, in the stop operation mode (time t4 to time t7), all of the group of sensors of the sensor module are stopped and the output data 9 is not generated.

3.4. Flowchart

Figure 12:
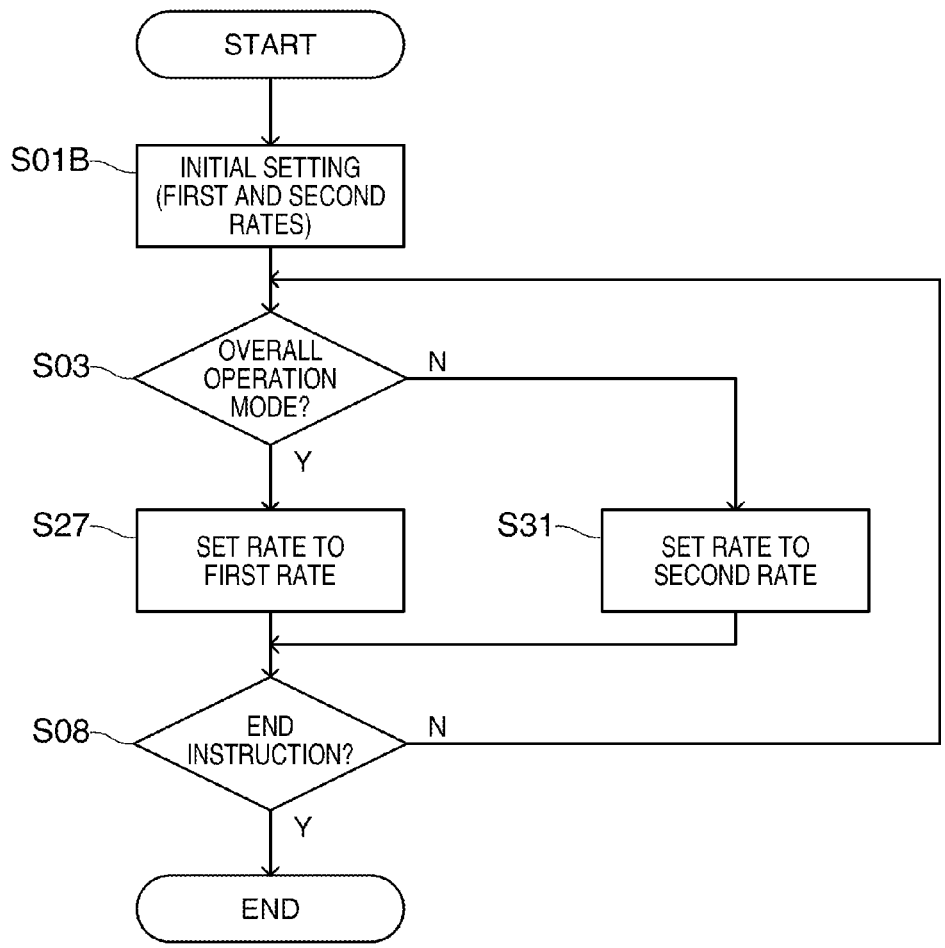
FIG. 12 is a flowchart in a third embodiment.

FIG. 12 shows a flowchart in the third embodiment. Steps same as those shown in FIGS. 5 and 11 are denoted by the same reference signs and explanation of the steps is omitted.

The data generating unit 14 in the third embodiment outputs the output data 9 at a rate set according to FIG. 12. The content of arithmetic processing on the inside of the data generating unit 14 may be adjusted according to the rate. In this example, since the operation mode of the sensor module 2 and switching of a rate of the output data 9 are associated with each other, it is possible to simplify control in the data generating unit 14.

First, initial setting is performed concerning the rate (S01B). In this example, a first rate, which is a normal rate, and a second rate, which is a rate lower than the first rate, are set as the rate.

When the operation mode is the overall operation mode (Y in S03), the data generating unit 14 determines that the sensing device 100 is performing the normal operation and sets the rate to the first rate (S27).

On the other hand, when the operation mode is not the overall operation mode (N in S03), the data generating unit 14 determines that the sensing device 100 is not operating and sets the rate to the second rate to suppress power consumption (S31).

Thereafter, if no end instruction is received, the data generating unit 14 returns to S03 and repeats the operation and the determination (N in S08). If an end instruction is received, the data generating unit 14 ends the processing (Y in S08).

4. Notification of an Internal State of the Sensing Device

Means and a method for notifying a state of a rate in the third embodiment to the outside of the sensing device are explained with reference to FIG. 13. Since information concerning an output rate is determined by the sensor module and the controller, the information is closed on the inside of the sensing device 100. However, it is desirable in terms of system management and appropriate data access to include means for making it possible to recognize the state of the rate in the third embodiment from the outside of the sensing device 100. Therefore, means explained below makes it possible to refer to the state of the rate from the outside of the sensing device.

4.1. Status Register

Figure 13:
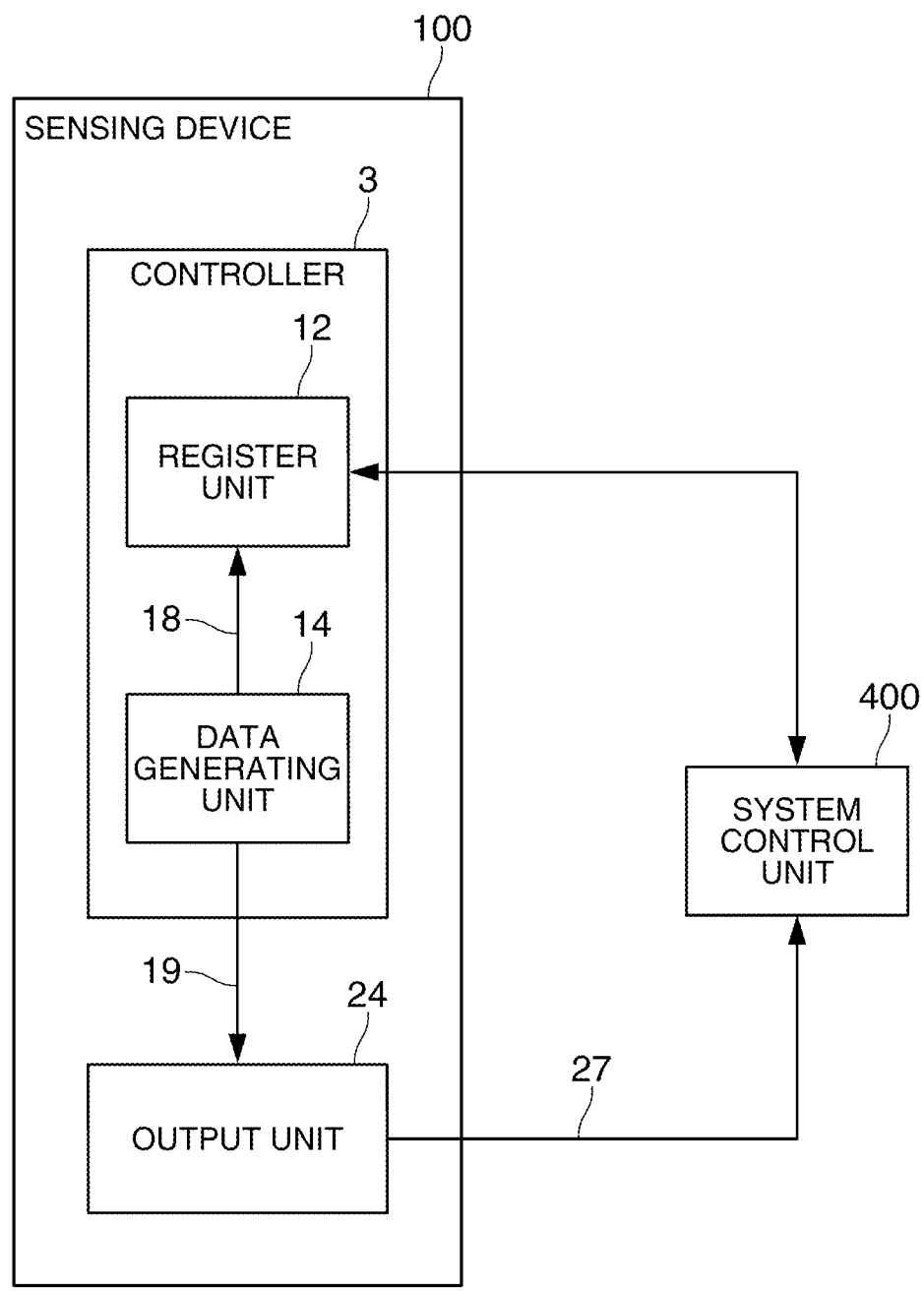
FIG. 13 is a diagram showing a connection example of a sensing device and a system control unit.

FIG. 13 shows connection of the sensing device 100 and a system control unit 400 in the third embodiment. The system control unit 400 means a control unit that is different from the control unit in the sensing device 100 and manages the entire system including the sensing device 100.

The controller 3 of the sensing device 100 may include the register unit 12. The register unit 12 has information concerning a rate as a status register. The status register is accessible from the system control unit 400 via, for example, the bus 26 (see FIG. 3). For example, the system control unit 400 can grasp a state of the rate by periodically accessing this register.

In changing the rate, the data generating unit 14 simultaneously updates the status register using the internal signal 18 (see FIG. 2). Consequently, the latest state of the rate is reflected on the status register.

4.2. Exclusive Output Signal

The data generating unit 14 may output a signal representing the state of the rate (a state output signal 19) from the output unit 24 as the output signal 27. In this case, the system control unit 400 can always grasp the operation mode and the state of the rate without accessing the status register.

4.3. Interrupt Signal

However, for example, when the number of wires from the output unit 24 to the system control unit 400 is limited, the data generating unit 14 may generate an interrupt signal as the output signal 27 simultaneously with the update of the status register. The interrupt signal can be realized by one signal line. The system control unit 400 that receives an interrupt request can grasp the state of the rate after change by accessing the status register. Since the interrupt occurs only during the update of the status register, the system control unit 400 can efficiently grasp the state of the rate.

The output signal 27 may include not only a signal concerning the rate but also a mode control signal and the like.

5. Application Examples

Application examples of the invention are explained with reference to FIGS. 14A to 14C. The sensing devices 100 and 100A explained above can be applied to various electronic apparatuses.

Figure 14A:
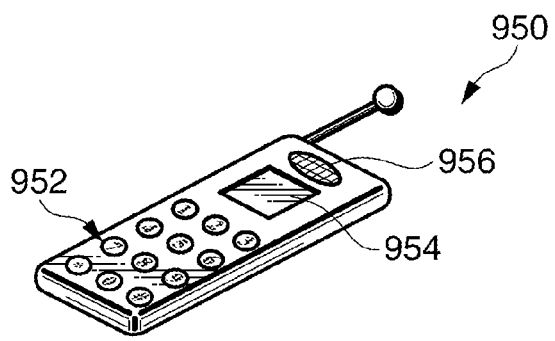
FIG. 14A is a diagram of a cellular phone, which is an example of an electronic apparatus.

An example of an external view of a cellular phone 950, which is one of the electronic apparatuses, is shown in FIG. 14A. The cellular phone 950 includes a dial button 952 that functions as an input unit, an LCD 954 that displays a telephone number, a name, an icon, and the like, and a speaker 956 that functions as a sound output unit and outputs sound.

Figure 14B:
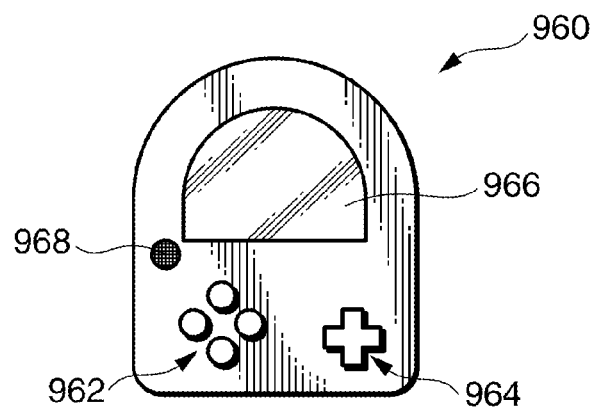
FIG. 14B is a diagram of a portable game apparatus, which is an example of the electronic apparatus.

An example of an external view of a portable game apparatus 960, which is one of the electronic apparatuses, is shown in FIG. 14B. The portable game apparatus 960 includes an operation button 962 and a cross key 964 that function as input units, an LCD 966 that displays a game image, and a speaker 968 that functions as a sound output unit and outputs game sound.

Figure 14C:
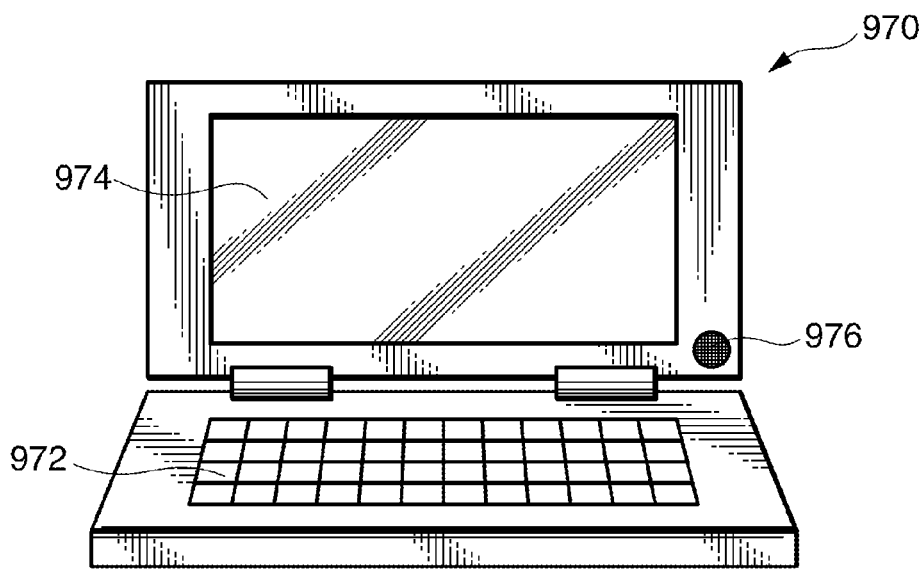
FIG. 14C is a diagram of a personal computer, which is an example of the electronic apparatus.

An example of an external view of a personal computer 970, which is one of the electronic apparatuses, is shown in FIG. 14C. The personal computer 970 includes a keyboard 972 that functions as an input unit, an LCD 974 that displays characters, numbers, graphics, and the like, and a sound output unit 976.

By incorporating the sensing devices according to the embodiments in the electronic apparatuses shown in FIGS. 14A to 14C, for example, it is possible to suppress power consumption when there is no motion in the electronic apparatuses. Therefore, it is possible to provide suitable electronic apparatuses having a long battery driving time.

6. Others

In the embodiments, the sensing devices may have a configuration in which the blocks (the sensor module 2, the controller 3, etc.) are individually connected not through the bus 26 shown in FIG. 3. The motion sensor may be either a one-dimensional motion sensor or a multi-dimensional motion sensor. For example, when the operation mode is other than the overall operation mode, the multi-dimensional sensor may operate only in a part of directions to detect movement, acceleration, and the like in a specific direction.

The invention is not limited to the examples explained above and includes configurations substantially the same as the configurations explained in the embodiments (e.g., configurations having the same functions, methods, and results or configurations having the same purposes and effects). The invention includes configurations obtained by replacing non-essential sections of the configurations explained in the embodiments. The invention includes configurations that can realize working effects same as those of the configurations explained in the embodiment and realize purposes same as those of the configurations. The invention includes configurations obtained by adding publicly-known techniques to the configurations explained in the embodiments.

The entire disclosure of Japanese Patent Application No. 2010-164594, filed Jul. 22, 2010 is expressly incorporated by reference herein.

What is claimed is:

1. A sensing device comprising:
   a sensor module that includes a group of sensors, at least one of which being a motion sensor, the sensor module being configured to output a sensing result;
   a control unit configured to switch between an overall operation mode in which all of the group of sensors operate and a partial operation mode in which a part of the group of sensors operate based on an output from the motion sensor, the control unit being configured to output a mode control signal when the control unit switches between the overall operation mode and the partial operation mode;
   a data generation unit configured to generate output data based on the sensing result of the sensor module at a predetermined rate, wherein
   the predetermined rate is changed at multiple stages based on the mode control signal and an elapsed time after the mode is switched between the overall operation mode and the partial operation mode,
   the control unit calculates a mean of a plurality of outputs from the motion sensor,
   the control unit switches from the overall operation mode to the partial operation mode when the mean is smaller than a first threshold in a predetermined time,
   the control unit switches from the partial operation mode to the overall operation mode when the mean is larger than a second threshold,
   the second threshold is greater than or equal to the first threshold, and
   the predetermined time is more than several seconds.

2. The sensing device according to claim 1, further comprising a register unit including a status register that represents the predetermined rate at which the output data is generated, wherein the data generating unit updates the status register when the predetermined rate changes.

3. The sensing device according to claim 2, wherein the data generating unit outputs an interrupt signal when the status register is updated.

4. The sensing device according to claim 1, wherein the data generating unit outputs a signal representing the predetermined rate at which the output data is generated.

5. The sensing device according to claim 1, further comprising:
a display device that displays an image.

6. A sensing device comprising:
a sensor module that includes a group of sensors, the sensor module being configured to output a sensing result;
an auxiliary sensor module that includes at least one motion sensor;
a control unit configured to switch between an overall operation mode in which all of the group of sensors operate and a stop operation mode in which a part of the group of sensors stops operating based on an output from the motion sensor, the control unit being configured to output a mode control signal when the control unit switches between the overall operation mode and the stop operation mode; and
a data generation unit configured to generate output data based on the sensing result of the sensor module at a predetermined rate, wherein
the predetermined rate is changed at multiple stages based on the mode control signal and an elapsed time after the mode is switched between the overall operation mode and the stop operation mode,
the control unit calculates a mean of a plurality of outputs from the motion sensor,
the control unit switches from the overall operation mode to the stop operation mode when the mean is smaller than a first threshold in a predetermined time,
the control unit switches from the stop operation mode to the overall operation mode when the mean is larger than a second threshold,
the second threshold is greater than or equal to the first threshold, and
the predetermined time is more than several seconds.

7. A sensing device comprising:
a sensor module that includes a group of sensors, at least one of which being a first motion sensor, the sensor module being configured to output a sensing result;
an auxiliary sensor module that includes at least one second motion sensor; and
a control unit configured to switch between an overall operation mode in which all of the group of sensors operate and a stop operation mode in which a part of the group of sensors stops operating based on an output from one of the first motion sensor and the second motion sensor and that switches between an operation mode in which the auxiliary sensor module operates and a stop mode in which the auxiliary sensor module does not operate based on the overall operation mode and the stop operation mode of the sensor module, the control unit being configured to output a mode control signal when the control unit switches between the overall operation mode and the stop operation mode; and
a data generation unit configured to generate output data based on the sensing result of the sensor module at a predetermined rate, wherein
the predetermined rate is changed at multiple stages based on the mode control signal and an elapsed time after the mode is switched between the overall operation mode and the stop operation mode,
the control unit calculates a first mean of a plurality of outputs from the first motion sensor, and the control unit calculates a second mean of a plurality of outputs from the second motion sensor,
the control unit switches from the overall operation mode to the stop operation mode when the first mean is smaller than a first threshold in a predetermined time,
the control unit switches from the stop operation mode to the overall operation mode when the second mean is larger than a second threshold,
the second threshold is greater than or equal to the first threshold,
the control unit switches from the operation mode to the stop mode when the sensor module is the overall operation mode,
the control unit switches from the stop mode to the operation mode when the sensor module is the stop mode, and
the predetermined time is more than several seconds.

* * * * *